No. 725,482. PATENTED APR. 14, 1903.
L. RENAULT.
SPEED CHANGING AND CLUTCH MECHANISM FOR MOTOR VEHICLES.
APPLICATION FILED NOV. 29, 1901.
NO MODEL. 7 SHEETS—SHEET 1.

WITNESSES:
W. M. Avery
H. J. Bernhard

INVENTOR
Louis Renault
BY
ATTORNEYS.

No. 725,482. PATENTED APR. 14, 1903.
L. RENAULT.
SPEED CHANGING AND CLUTCH MECHANISM FOR MOTOR VEHICLES.
APPLICATION FILED NOV. 29, 1901.
NO MODEL. 7 SHEETS—SHEET 2.

WITNESSES:
W. M. Avery
N. J. Bernhard

INVENTOR
Louis Renault
BY
Munn
ATTORNEYS.

No. 725,482. PATENTED APR. 14, 1903.
L. RENAULT.
SPEED CHANGING AND CLUTCH MECHANISM FOR MOTOR VEHICLES.
APPLICATION FILED NOV. 29, 1901.
NO MODEL. 7 SHEETS—SHEET 3.

WITNESSES:
W. M. Avery
N. F. Bernhard

INVENTOR
Louis Renault
BY
ATTORNEYS.

No. 725,482. PATENTED APR. 14, 1903.
L. RENAULT.
SPEED CHANGING AND CLUTCH MECHANISM FOR MOTOR VEHICLES.
APPLICATION FILED NOV. 29, 1901.
NO MODEL. 7 SHEETS—SHEET 5.

WITNESSES:
W. M. Avery
N. T. Bernhard

INVENTOR
Louis Renault
BY Munn
ATTORNEYS.

No. 725,482. PATENTED APR. 14, 1903.
L. RENAULT.
SPEED CHANGING AND CLUTCH MECHANISM FOR MOTOR VEHICLES.
APPLICATION FILED NOV. 29, 1901.
NO MODEL. 7 SHEETS—SHEET 6.

WITNESSES:
W. M. Avery
N. T. Bernhard

INVENTOR
Louis Renault
BY
Munn
ATTORNEYS.

No. 725,482. PATENTED APR. 14, 1903.
L. RENAULT.
SPEED CHANGING AND CLUTCH MECHANISM FOR MOTOR VEHICLES.
APPLICATION FILED NOV. 29, 1901.
NO MODEL. 7 SHEETS—SHEET 7.

WITNESSES:
W. M. Avery
N. H. Bernhard

INVENTOR
Louis Renault
BY
Munn
ATTORNEYS.

UNITED STATES PATENT OFFICE.

LOUIS RENAULT, OF PARIS, FRANCE.

SPEED-CHANGING AND CLUTCH MECHANISM FOR MOTOR-VEHICLES.

SPECIFICATION forming part of Letters Patent No. 725,482, dated April 14, 1903.

Application filed November 29, 1901. Serial No. 84,133. (No model.)

*To all whom it may concern:*

Be it known that I, LOUIS RENAULT, a citizen of the Republic of France, and a resident of Paris, France, have invented certain new and useful Improvements in Speed-Changing and Clutch Mechanism for Motor-Vehicles, of which the following is a full, clear, and exact specification.

This invention consists of a speed-changing mechanism for motor-vehicles, which mechanism is represented, by way of example, in the accompanying drawings, in which—

Figure 1:
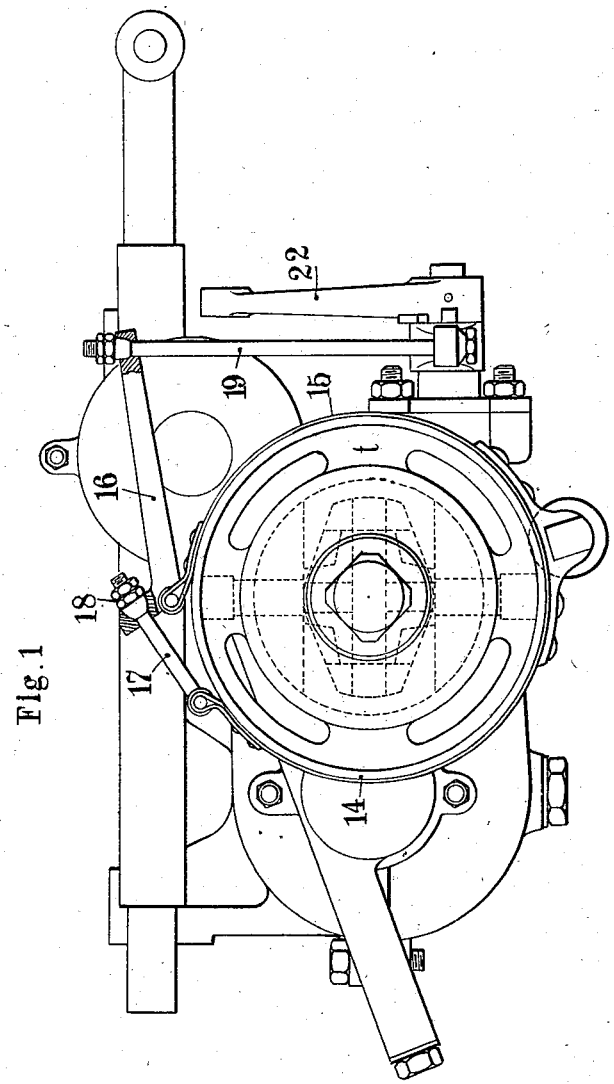
Figure 2:
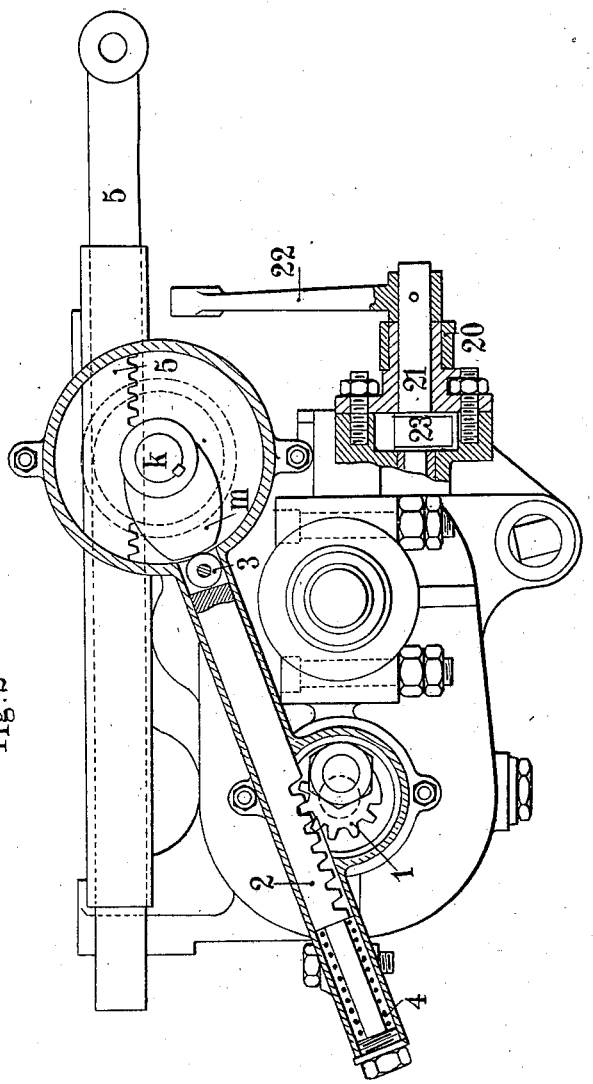
Figure 3:
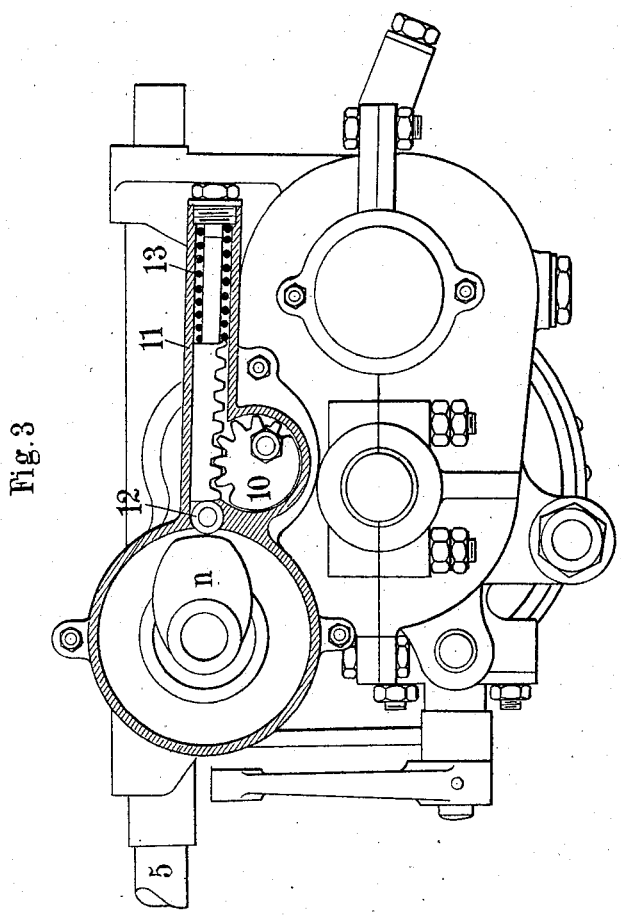
Figure 4:
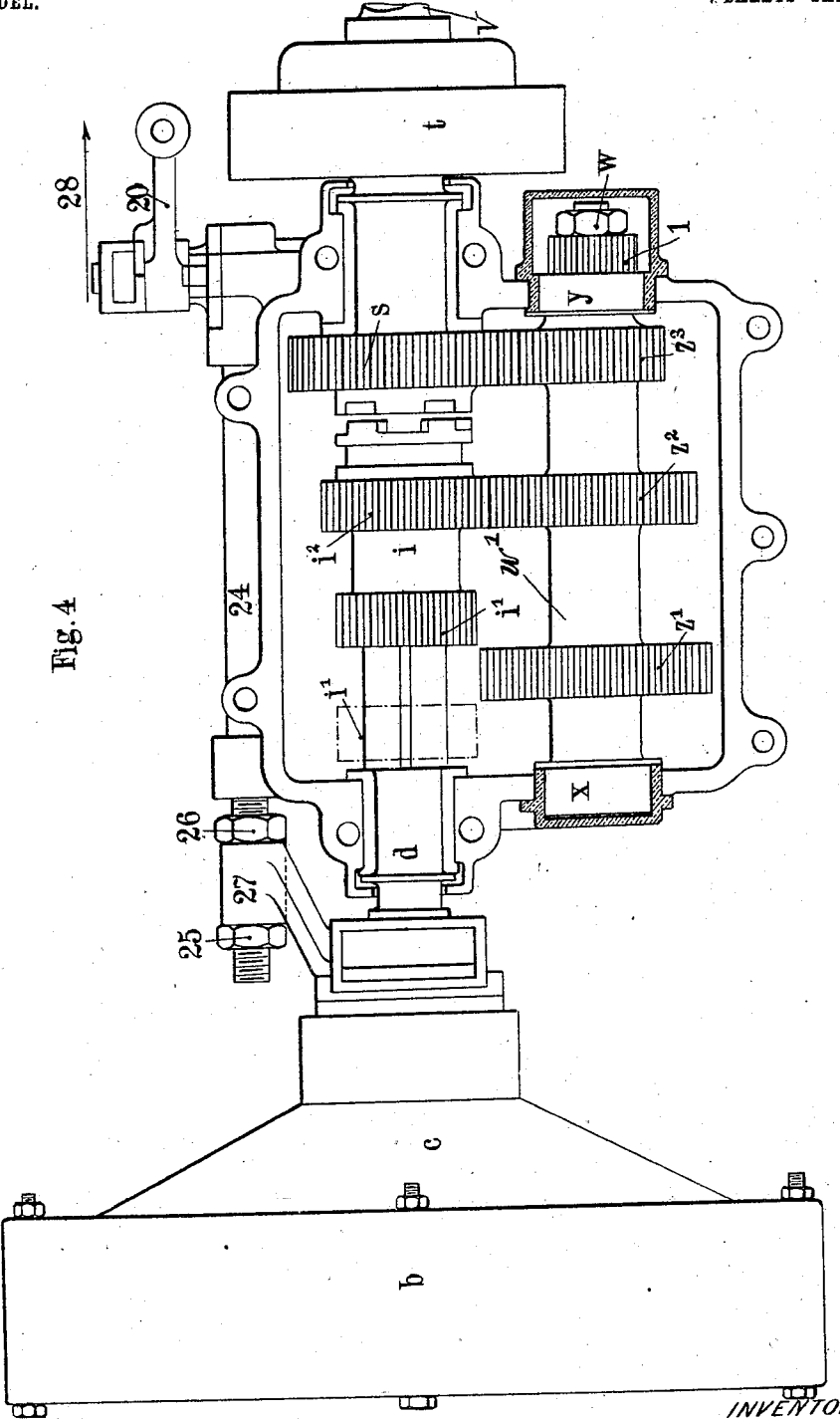
Figure 5:
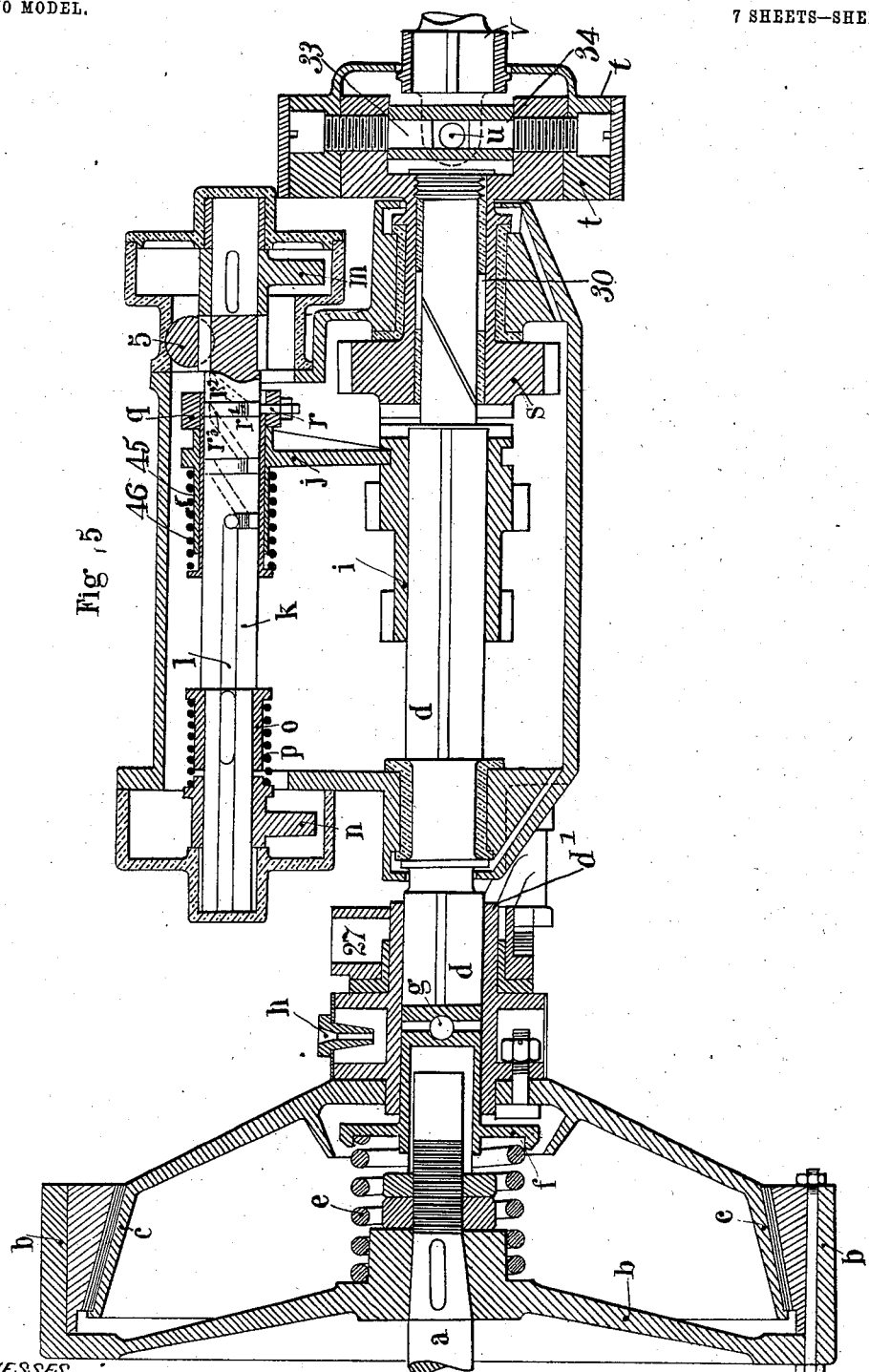
Figure 6:
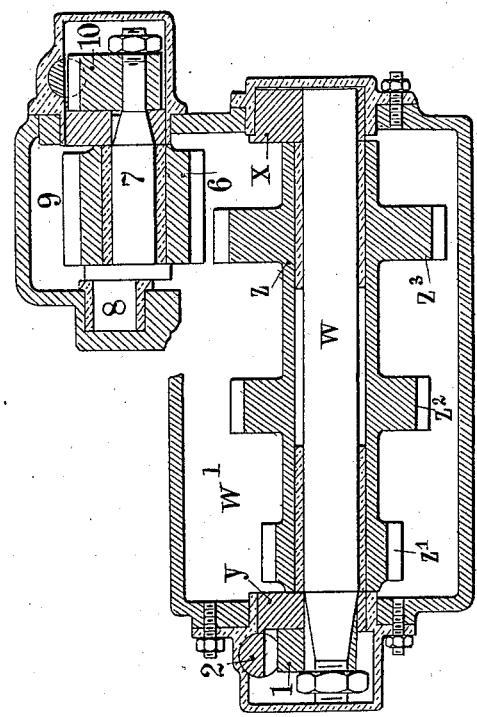
Figure 7:
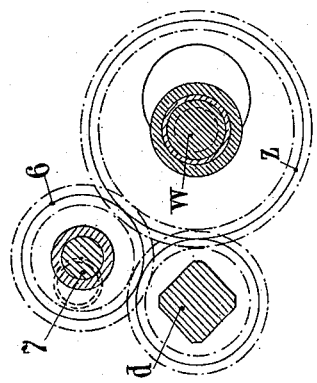

Figure 1 is an end elevation of the mechanism. Figs. 2 and 3 are cross-sections through the same. Figs. 4 and 5 are respectively a plan view and a longitudinal section through the mechanism. Fig. 6 is a cross-section through the mechanism upon the axis of the eccentric-shaft of the triple pinion, and Fig. 7 is a diagrammatic view showing in cross-section the relative arrangement of the shafts and gear-wheels. Fig. 8 is a side elevation of the Cardan joint, the casing of the latter being cut away on the line A B of Fig. 10. Fig. 9 is a transverse section of the device, taken in the plane of the line C D of Fig. 8. Fig. 10 is an end view of the Cardan joint looking from the right of Fig. 8 and with the casing in section on the line E F of said Fig. 8. Fig. 11 is a horizontal section on the line G H of Fig. 8. Fig. 12 is an elevation of the grooved shaft drawn on an enlarged scale and in a reversed position to that shown in Fig. 5 in order to clearly illustrate the helicoidal parts of the groove, and Fig. 13 is a top plan view of the grooved shaft shown by Fig. 12.

Upon the shaft $a$ of the motor, Figs. 4 and 5, is rigidly fixed the fly-wheel $b$, within which fits a friction-cone $c$, which is connected by means of a square sleeve to a shaft $d$ and maintained in engagement by a spiral spring $e$, bearing upon a cup $f$ and exerting a thrust upon a ball $g$, which serves as a pivot and which may be lubricated by means of oil introduced into the lubricating-hole $h$.

The shaft $d$ is formed with a square portion upon which the double pinion $i$ is adapted to slide freely. This pinion is provided with gears of different diameters, and in one of its extremities are formed notches or grooves for the engagement of a fork $j$, movably mounted on the shaft $k$, by means of which fork it may be displaced upon the shaft $d$.

The shaft $k$ is formed with a groove $l$, presenting successively a circular form for a quarter of a circumference, a helicoidal form for half a circumference, then again a circular form for half a circumference, a helicoidal form for another half-circumference, and finally a circular form for half a circumference and a helicoidal form for a quarter circumference.

Upon one of the extremities of the shaft $k$ is keyed a cam $m$, Figs. 2 and 5, while upon its other extremity is mounted loose a similar cam $n$, in which notches are formed, Fig. 3. Beside the cam $n$ is fixed a ring $o$, also provided with notches, which is keyed upon the shaft $k$, but in such a manner as to be capable of sliding upon it. Between the cam $n$ and the ring $o$ is a spring $p$, maintaining these two parts separated in such a manner that the cam $n$ remains loose upon the shaft $k$.

The fork $j$, Fig. 5, is adapted to slide, but not to rotate upon itself, upon a tube $q$, provided with a small projection $r$, which enters the helicoidal groove $l$ of the shaft $k$.

Upon the extremity of the shaft $d$ is mounted loose a large pinion $s$, Figs. 1, 4, and 5, provided upon its side adjacent to the pinion with notches by means of which the two pinions may be rigidly connected one with the other when occupying a certain position. The pinion $s$ is rigidly connected to a brake-drum $t$, within which is maintained and driven by screws the head of a Cardan joint $u$, provided with a fork within which fits a square $v$, constituting the extremity of the transmission-shaft.

The Cardan joint (illustrated more particularly by Figs. 8 to 11, inclusive) is contained in a cup-shaped casing $t'$, (see Figs. 8 and 11,) said casing being fitted upon the periphery of the disk 29, which is formed in one piece with the boss or hub 30 of the pinion S. In the interior of said casing are provided two diametrically opposite blocks 31 32, on which are hinged by the pivot-screws 33 and 34 (see Fig. 9) the opposite tubular arms 35 36 of a hollow cross-head $u'$. The other arms 37 38 of the cross-head are similarly journaled on pivot-screws 39 40, which are mounted on the parallel ends of a fork 41, (see Figs. 8 and 10,)

said fork being keyed on the shaft $v$. The boss 42 of said fork passes and works freely through a central aperture 43, which is provided in the rounded shell 44 of the casing $t$, so that any rotary motion may be transmitted directly from the boss 30 of the pinion $s$ to the shaft $v$, even when these two parts are not in alinement with each other.

Parallel with the shaft $d$ is arranged another shaft $w$, Figs. 2, 4, 5, and 6, mounted upon two eccentrics $x\ y$, and upon which rotates freely a triple pinion $z$, provided with three gears of different diameters.

The eccentric $y$ is rigidly connected to a small toothed pinion 1, meshing with a rack 2, at the extremity of which is a roller 3, maintained constantly in contact with the cam $m$, Fig. 2, by the action of a spiral spring 4, which is exerted upon the other extremity of the rack 2. Another rack 5, Figs. 2 and 5, in engagement with teeth formed upon the distributing-shaft $k$, serves to transmit movement to this latter.

Above the pinion $z$, Fig. 6, is a pinion 6, mounted upon an eccentric-shaft 7, provided at one of its extremities with a crank-pin 8 and at the other with an eccentric 9, rigidly connected with a gear-wheel 10, Fig. 3, driven by a rack 11, terminating in a roller 12, adapted to travel upon the driving-cam $n$, against which it is applied by a counter-spring 13. This pinion is arranged in such a manner that it may be placed in engagement simultaneously with the teeth having the smallest diameter upon the double pinion $i$ and with the teeth having the largest diameter upon the triple pinion $z$.

Around the brake-drum $t$, Fig. 1, is a cast-iron segment 14, surrounded by a steel band 15, one of the extremities of which is hinged to the lever 16, while the other extremity is hinged to a rod 17, upon which is screwed an adjusting-screw 18. The lever 16 is actuated by means of a rod 19, which is itself operated by a lever 20, rotating loose around the axis 21, upon which is pivoted a lever 22. This latter is provided with a projecting pin, which in certain positions displaces with it the lever 20, acting upon the brake-band.

A cam 23, Fig. 2, keyed at the extremity of the shaft 21, acts upon a shaft 24, Fig. 4, at the extremity of which is maintained by two screws 25 26 a fork 27, to which is thus imparted the movements of the cam 23 transmitted to this latter by the lever 22.

The mechanism above described enables the following operations to be effected.

*First—Engagement and braking.*—Assuming that there is exerted upon the lever 22 an effort in the direction of the arrow 28, Fig. 4, this effort is transmitted by the intermediary of the cam 23 to the fork 27, which is thus displaced and, compressing the spring $e$, presses toward the interior of the fly-wheel $b$ the friction-cone $c$, which is consequently released. If this effort upon the lever 22 is continued, it will cause the lever 20 to participate in its movement and by the intermediary of the rod 19 will displace the lever 16, which latter exerting traction upon the rod 17 applies the segment 14 against the drum $t$, and thus applies the brake. It is therefore apparent that any movement imparted to the lever 22 results, on the one hand, in disengaging the motor and the shaft $d$, which is invariably connected to the cone $c$, and, on the other hand, if the effort upon the lever 22 is prolonged the brake is caused to act upon the drum $t$, which transmits its movement to the shaft $v$, invariably connected with this latter, this braking being effected only after disengagement of the cone $c$.

*Second—Change of speed.*—As above stated, the fork $j$ is free to slide upon the part $q$, without, however, being able to rotate upon it. It follows from this that this part follows exactly by the intermediary of the pin $r$ the movements of the groove $l$, formed upon the shaft $k$. In Figs. 4 and 5 the speed-changing mechanism is represented in the position in which none of the gear-wheels and none of the notches are in engagement. If the shaft $k$ is rotated through a half-revolution in such a manner that the pin $r$ passes from the position $r'$ to the position $r^2$, a lateral displacement of the fork $j$ will take place, and the pinion $i$ will become locked with the pinion $s$ by the intermediary of the notches forced in their extremities, the spring provided upon the fork serving only to permit this latter to slide momentarily. The speed-change sleeve, which is illustrated by dotted lines on Figs. 12 and 13 and plainly shown in longitudinal section on Fig. 5, consists of two coaxial parts $q$ and 45, said part 45 being fitted to slide endwise along the part $q$. In the case where the part $q$ has been shifted laterally by the action of the cam-groove on the pin $r$ the clutch projections of the pinion $i$ are not opposite to the corresponding notches of the pinion $s$. The coiled spring 45, which is interposed between the parts $q$ and 45, is compressed and holds the gear $i$ against the face of the gear $s$ until said projections and notches after a short rotation register with each other, at which moment the spring 46 expands itself suddenly, and thereby causes the gear $i$ to operatively engage with the gear $s$. If instead of imparting to the shaft $k$ a movement in the direction $r'\ r^2$ it is caused to effect half a revolution, so that the pin $r$ passes from the position $r'$ to the position $r^3$, the cam would occupy (if the pin $r$ were at the point $r^3$) the position represented in Fig. 2—that is to say, it would have displaced the rack 2, caused the eccentric-shaft $w$ to rotate, and placed the four pinions $s\ z^3\ z^2\ i^2$, Fig. 4, in contact. If the shaft $k$ is caused to rotate through a further half-revolution in the direction from $r'$ to $r^3$, a lateral displacement of the pinion $s$ would be produced, because the cam $m$ would be diametrically opposite to the position which it occupies in Fig. 2. The eccentric-shaft W would then have rotated through half a revolution, thus causing the disengagement of the pinions $s\ z^3\ z^2\ i^2$. If the shaft $k$ is still further rotated through half a revolution in the same direction, the fork $j$ is laterally displaced by the thickness of a pinion. Owing to this, the pinion $i'$, Fig. 4, will be brought opposite the pinion $z$, but the cam $m$ will return to the position represented in Fig. 7, and the four gear-wheels $s\ z^3\ i'\ z'$ will be in engagement. Another half-revolution given to the shaft $k$ in the same direction will cause the disengagement of the pinions $s\ z^3\ i'\ z'$ and then the parallel displacement of the triple pinion $z$ as a whole. Finally, if the shaft $k$ is still further rotated in the same direction a fresh lateral displacement of the pinion $i$ would be produced, and at this moment the pinion $i'$ would occupy the position shown in dotted lines in Fig. 4. The fork $j$ and the part $q$ in passing from the position which they occupied when the pinion $i'$ was opposite the pinion $z'$ to the position shown in dotted lines in Fig. 4 will displace the ring $o$ in compressing the spring $p$, thereby rigidly connecting the cam $n$ and the ring $o$, the notches of these parts engaging, and the cam $n$ will participate in the movement of the shaft $k$. In effecting this last quarter-revolution the cam $n$ will assume the position represented in Fig. 3—that is to say, it will have pressed down the rack 11, which displaces the eccentric 9, which latter displaces the shaft 7 laterally. In this manner the pinion 6 is caused to mesh as well with the toothed wheel $z'$, Fig. 4, of the pinion $z$ as with the toothed wheel $i'$ of the pinion $i$, said toothed wheel $i'$ being at this moment in the position represented by dotted lines on said Fig. 4. By interposing the gear-wheel 6 between $i'$ and $z'$ the direction of rotation is changed—that is to say, backward travel is produced. If the shaft $k$ is again rotated, but in the reverse direction, all the operative phases above described will be reproduced, but in inverse order.

The movement of the eccentrically-mounted shafts 7 and $w$ control the intermeshing of the speed-changing gears of my invention, and from the preceding description it is to be understood that these shafts 7 and $w$ are each capable of a bodily-shifting adjustment in a lateral direction or in a direction transverse to its axis in order that the gears on said shafts may be made to mesh with the high-speed or low-speed gears of the train of gearing. By reference to Fig. 7 it is to be noted that the eccentrically-mounted shaft 7 occupies such relation to the other shafts and gears that the axis of said shaft 7 moves in a path at a tangent to the periphery of the gears on the shafts $d$ and $w$, or, in other words, the shaft 7 may be shifted bodily in a path to intersect the plane of the gears on the shafts $d$ and $w$, thus making the gears engage and disengage by a movement of one part substantially in a path tangential to the gears on the other part or parts.

In short, it will be apparent from the foregoing that when the gear-wheels $i'$ and $z'$ are connected by means of the pinion 6 backward travel is produced. When the pinion $i'$ is connected directly with the pinion $z'$ simultaneously with $s$ and $z^3$, the vehicle will travel at its low speed. When the gear-wheels $s\ z^3\ z^2\ i^2$ are in engagement, as represented in Fig. 4, the vehicle travels at its middle or second speed. When the gear-wheel $i$ is connected with the gear-wheel $s$ by means of the notches formed at their extremities, the vehicle travels at its highest speed by direct driving—that is to say, without there being any gear-wheel in engagement.

It is obvious that by providing the pinion $i$ with three gears of different diameters instead of two, $i'\ i^2$, as in the example given above, and the pinion $z$ with four gears instead of three, $z'\ z^2\ z^3$, a speed-changing mechanism might be constructed upon the same principle, but providing four different speeds instead of three and also backward travel.

I wish it to be understood that I do not confine myself strictly to the precise constructional details above specified, but may modify the same without departing from the spirit of my invention.

I claim—

1. In a speed-changing gear for motor-vehicles, the combination with a motor-shaft, of a high-speed gear directly driven by said shaft, a low-speed gear consisting of a plurality of gear-wheels caused to engage by lateral shifting movements, and means for producing rearward travel.

2. In a speed-changing gear for motor-vehicles, the combination with a motor-shaft, of a high-speed gear directly driven by said shaft, a low-speed gear consisting of a series of gear-wheels caused to engage by lateral shifting movements, and means comprising a single rack and a spur-pinion interposable between said gear-wheels and the speed-changing wheels for producing backward travel.

In testimony whereof I have hereunto signed my name in the presence of two subscribing witnesses.

LOUIS RENAULT.

Witnesses:
ARMAND PICARD,
EDWARD P. MACLEAN.